US005787413A

United States Patent [19]

Kauffman et al.

[11] Patent Number: 5,787,413
[45] Date of Patent: Jul. 28, 1998

[54] C++ CLASSES FOR A DIGITAL LIBRARY

[75] Inventors: Steven Victor Kauffman, San Jose; Lara Marie Lewis, Campbell; James Albert Willey, San Jose, all of Calif.

[73] Assignee: International Business Machines Corporation, Armonk, N.Y.

[21] Appl. No.: 688,120

[22] Filed: Jul. 29, 1996

[51] Int. Cl.⁶ .................................................. G06F 17/30
[52] U.S. Cl. .................................................. 707/2; 707/100
[58] Field of Search ........................................ 707/2, 100

[56] References Cited

U.S. PATENT DOCUMENTS

| 5,247,669 | 9/1993 | Abraham et al. | 707/103 |
| 5,455,903 | 10/1995 | Jolissaint et al. | 345/348 |
| 5,499,371 | 3/1996 | Henninger et al. | 395/702 |
| 5,500,802 | 3/1996 | Morris et al. | 364/474.24 |
| 5,504,892 | 4/1996 | Atsatt et al. | 707/103 |
| 5,515,508 | 5/1996 | Pettus et al. | 395/200.33 |
| 5,583,983 | 12/1996 | Schmitter | 395/705 |
| 5,627,979 | 5/1997 | Chang et al. | 345/335 |
| 5,649,185 | 7/1997 | Antognini et al. | 707/9 |
| 5,664,189 | 9/1997 | Wilcox et al. | 707/205 |
| 5,680,619 | 10/1997 | Gudmundson et al. | 395/701 |

OTHER PUBLICATIONS

*English language abstract of* Devloo et al; "C++ interface for programming on the Connection Machine"; May 1992.; *Inst. Nat. Recherche Inf. Autom., Le Chesnay, France.*

Istavrinos, P.; "Experiences with an object-oriented mapper for coherent distributed shared memory"; 1992; *Proceedings of the Second International Workshop on Object Orientation in Operating Systems*, pp. 257–261.

Jones, Callie; "Iris ViewKit Sees New Productivity for Developers"; May 1994; *Silicon Graphics World* vol. 4 No. 5 pp. 1, 9.

Schmidt, D.C.: "A C++ wrapper for UNIX I/O multiplexing: the object–oriented design and implementation of the Reactor"; Sep. 1993; *C++ Report* vol. 5 No. 7 pp. 32–43.

Abstract of Schmidt, D.C.; "Encapsulating operating system IPCs. An object–oriented interface for event–driven UNIX I/O multiplexing"; Feb. 1993; *C++ Report* vol. 5, No. 2 pp. 43–50.

*Primary Examiner*—Wayne Amsbury
*Attorney, Agent, or Firm*—Sughrue, Mion, Zinn, Macpeak & Seas, PLLC

[57] ABSTRACT

An overall programming interface containing hundreds of application program interfaces (API's) for performing library functions on data objects in a digital client/server library system is simplified through a new, object oriented interface containing a small number of object oriented classes. Object instances created from the object oriented classes have member functions which are invoked by application programs, and the member functions issue appropriate calls to the API's. Information returned from the API's is handled by the calling object and provided to the application program in a simplified form.

16 Claims, 2 Drawing Sheets

C++ CLASSES FOR A DIGITAL LIBRARY

BACKGROUND OF THE INVENTION

1. Field of the Invention

This invention is related to the field of application programming in a distributed storage management environment. In particular, it relates to a method and system for developing custom software application programs which facilitate the creation, storage, modification, and retrieval of binary large objects (blobs). More particularly, it relates to a simplified method and a system for developing custom software application programs which operate in a digital client/server library environment through the use of an improved overall programming interface.

2. Description of the Related Art

Digital client/server library

Client/server object storage systems have been used to store and manage a wide variety of digital objects such as documents, graphics, audio, video, spread is sheets and word-processing text. The IBM IMAGEPLUS VISUAL-INFO product provides such capabilities.

Such digital objects are known generally as binary large objects (blobs). In this discussion, they will be referred to as "data objects" so as to distinguish them from those objects related to OOP.

A conceptual view of the client/server relationship in IBM's IMAGEPLUS VISUALINFO is shown in FIG. 1 and includes a library server 10, one or more data object servers 20 and one or more clients 30. Each of the library and data object servers and the client includes a respective information store. That is, the library server 10 includes a library catalog 12, the data object server 20 includes a data object store 22 and the library client 30 includes an information store 32. Also, a communications isolator (not shown) is included which allows the library server, data object server and library client to communicate with one another without concern for complex communications protocols. The library server, data object servers and clients are connected by a communications network, such as a wide-area network (WAN).

The library clients 30 each send requests to the library server 10 to perform library functions (e.g., to store, retrieve, and update) with respect to data objects stored in data object servers 20, and library functions with respect to the data object indexes and descriptive information stored in library catalog 12 (e.g., to query or to update). Library client requests are generated by library patrons using software programs which are associated with library client hardware such as a computer terminal, a workstation, or the like. These patrons are users who have been granted privileges for the use of the library system. The software programs used by the patrons are generally referred to as application programs.

Two types of library servers have been used, a host based library server (HBLS) and a LAN based library server (LBLS). The HBLS is a program that can be implemented in a mainframe computer in an IBM MVS/ESA environment running under CICS. The library catalog that it interacts with can be implemented with an IBM DATABASE 2 (DB2) database.

The LBLS is a program implemented in a workstation environment, such as under the IBM OS/2 operating system. The library catalog with which it interacts can be implemented using an IBM OS/2 DB2 database.

It will readily be appreciated that the digital client/server library is a combination of hardware and software which cooperate to manipulate the data objects. For the purposes of this discussion, the software which causes the hardware to perform particular functions with respect to data objects will be referred to as "system software." Furthermore, the particular functions shall be referred to as "library functions." Library functions may include, for example, the storage, the retrieval, the indexing, the insertion, the deletion, and the modification of data objects. The library server, the data object servers, and the clients may be considered to be the key components of the digital client/server library.

This discussion now turns to some of the different library functions, many of which are initiated by a client request.

At the beginning of a client session, before the first library client request is processed, library server 10 checks library catalog 12 to ensure that the patron's name and password are valid. Next, the library server ensures that the patron has been granted the appropriate privileges to perform the requested library function. Each patron is assigned a set of privileges by a system administrator. An example of a library privilege is the ability to delete data objects.

Finally, the library server checks to ensure that the data object's owner has granted the patron the privileges needed to do what is requested (e.g., update the data object). The owner of a data object is the patron who first stored the data object.

When an owner stores a data object that owner must specify which other patrons are to have access to the data object.

Data objects stored in the library system can be checked out by a patron for a is specified period of time. This feature can be used to ensure that one patron's updates to a data object are not overwritten by another. While a data object is checked out by a patron, other patrons can retrieve the data object and view it, but they cannot update it. In typical implementations, there are groups of individuals who need access to the same data objects. Therefore, to simplify the process of granting access to data objects, a system administrator can define patrons as members of a group. When a patron is defined as a member of a group, that patron is able to access any data object for which the group has been granted privileges. Additionally, patrons can access data objects for which they have been specifically granted individual privileges. A patron can set default groups whose members will have access to the data objects the patron stores. When patrons store data objects, they have the option to use this default group, to grant specific privileges to groups and individual patrons, or to do both.

If a library client request involves the storage, retrieval, or update of a data object, library server 10 forwards the request to the data object server 20 that contains or will store the data object(s) referred to in the request based upon information provided by library catalog 12. If the library client request is a query of the information stored in library catalog 12, library server 10 will interact only with library catalog 12 and will not contact data object server 20.

The library catalog is analogous to a conventional library's card catalog. It is a single set of database tables which contain an index of all the data objects stored in s the library system. In addition, it can store information such as textual descriptions for each data object, information on the type of data object (e.g., image object, spreadsheet, text document), library patron names and privileges, access authorization data for each data object, links between data objects. The library catalog can also store a virtually unlimited number of property type/property value pairs for each data object (e.g., name/John, Age/35, Address/1 Greenway Drive). These property type/property value pairs are known as a data object's properties, and are also referred to as "attribute/value" pairs.

A data object server 20 maintains data objects stored within the library system. Data objects are stored or retrieved from a data object store 22 by data object server 20. Data object server 20 receives requests from library server 10 and communicates with library client 30 to complete the requests. Such a library system can contain several distributed data object servers.

Two types of data object servers have been used, a host based data object server (HBOS) and a LAN based data object server (LBOS). The HBOS is a program implemented on a mainframe computer, for example in a MVS/ESA environment running under CICS. It interacts with the IBM Object Access Method (OAM) to provide data object storage. The LBOS is a program implemented in a workstation, such as in an OS/2 environment, and provides data object storage on a local area network (LAN).

When a library patron's privileges are defined, a default data object server can be set for the patron. When a patron stores a data object, it will be stored in the default data object server for that patron. If it is later determined that a data object or a group of data objects should be relocated to a different data object server, a client application program can move the data objects from one data object server to another. Also, a system managed storage method, such as that disclosed in a U.S. patent application Ser. No. 08/036,305, now abandoned, filed Mar. 24, 1993 and assigned to IBM Corporation (BT992063), entitled "A Method And System For Parallel, System Managed Storage For Objects On Multiple Servers" by T. G. Burket et al. which is incorporated herein by reference, provides a means for moving a data object from one data object server to another.

An LBOS can be located on any workstation having sufficient hardware resources and is connected to the library server. Furthermore, LBOS can be located at a site remote from the library server and local to the user. This allows selected data objects to be stored close to a remote group of library patrons who will frequently use these data objects. This capability is called distributed data object storage. Distributed data object storage helps to reduce the costs associated with sending data objects over communications lines and provides better performance in storing and retrieving data objects.

The HBOS interacts with the IBM OAM to implement a data object store that is maintained as a set of IBM DB2 tables. These DB2 tables can be monitored, backed up, and recovered using standard DB2 utilities. OAM is capable of managing its information store using a combination of direct access storage devices (DASD) and write once read many (WORM) optical storage.

LBOS implements its data object store by using a combination of the LBOS workstation hard drives and an optional optical library subsystem (often called an optical jukebox). The optical library supported by LBOS is capable of storing optical cartridges internally. Shelf-resident optical cartridge support is also provided, thus greatly expanding the storage capacity of the optical server. LBOS controls the migration of data objects between the workstation hard drive, which functions as a staging area, and optical storage. Because a workstation's hard drive can access stored information faster than an optical jukebox, LBOS ensures that newly stored data objects and data objects that have recently been retrieved are maintained on the workstation hard drive. As the workstation hard drive becomes full, LBOS removes those data objects to optical storage that has been least recently accessed to free storage space for new data objects. A single drive optical drive can also be attached to LBOS to provide a transaction log as a backup mechanism for the optical library.

LBOS includes a variety of storage administration functions, such as transaction logging and the ability to write out duplicate copies of images and files to support full backup and recovery.

The library client 30 is the interface through which application programs can submit requests to the library system. These can include requests to store data objects, update/add descriptors to data objects, delete data objects and query information in the library catalog. Library requests can be submitted through the library client either individually or in batches.

FIG. 2 illustrates the data flow in a conventional digital client/server library system. A client, such as client 30, can be located remotely from the library server 10 and data object server 20. Typically, the client 30 is connected to library server 10 and data object server 20 via a wide-area network (WAN). Moreover, data object server 20 may be connected to library server 10 via a WAN.

When a requesting client 30 requests a data object, or binary large data object (blob), it sends a request I to library server 10 upon receipt of the request. Library server 10 determines, after consulting library catalog 12, the data object server which owns and stores the requested data object. Here, the owning data object server is shown as data object server 20, to which library server 10 issues a request 2. Upon receiving the request, data object server 20 retrieves the data object from data object store 22 and sends a copy 3 of it to client 30. Data object server 20 stores the data object in client information store 32, which may be implemented as a cache. When the data object is successfully transmitted to the client, data object server 20 sends a response 4 to library server 10 upon successful transfer of the data object to the client. Library server 10, in turn, sends a response 5 to requesting client 30 indicating to the client that the data object was successfully transferred, which allows the client to retrieve the data object from client information store 32 for use by a client application program.

Organization of data

Two concepts are key to understanding the organization of data in the digital client/server library system: the item and the part. An item, generally speaking, is a reference to one or more parts. A part is a piece of content, and "part" is the word which refers to "data object" as used in the above description.

For example, the movie The Sound of Music might be stored in a digital client/server library system. The movie, as a whole, is an item. The movie may have one or more parts, such as a first scene (e.g., opening scene on a mountain top), a first song, a second scene, opening credits, special effect sounds, etc. The parts are the lo content of the item, and a single part is one piece of content. A single part is a data object, and is stored in an object server.

Although an item may be created in the library before any of its parts exist, items usually have parts. For any item with parts, then, it is meaningful to imagine a list of parts. Further, a part cannot exist alone. A part must have an item to which it belongs. Thus, a part cannot be created before its item. In the preferred embodiment, a part can belong to only one item. As one of skill in the art will recognize, other embodiments are possible, including the simulation of a part belonging to a plurality of items.

Metadata is information that relates to an item, but is not content. For example, in a digital client/server library system in which a collection of movies constitute the items of a patron, the patron may wish to categorize his movies as being of a particular quality. That is, he might accord his favorite movies five stars, and his least favorite movies only one star. Clearly, such a quality rating is not part of the content of any movie in the collection. Instead, the quality rating is data about the movie. Data about an item that is not part of the content making up the item is called "metadata".

Each item, therefore, has metadata. Metadata is also referred to as "index data", since the metadata can be used to locate the item. For example, the digital client/server library system patron having a collection of movies might use the index data to identify all movies with a rating of four or five stars. This query would be answered by the library server after a search through the relevant index data of the patrons items. Thus, a search for items which fit the constraints of a query could usefully be thought of as a list of items.

Although an item's metadata may refer to particular attributes of that item (e.g., a particular movie has a particular quality rating), metadata may also serve to identify classes to which the item belongs (e.g., a particular movie is a musical). Such classes may be referred to as index classes.

Just as items have metadata, so do parts. Information about a part which is not the content of the part is metadata. For example, a part of The Sound of music might be the recording of Edelweiss. The patrons content is the music, but information about the recording is metadata (e.g., title, recording format, duration, etc.).

Finally, it is important to understand that items may optionally be, and normally are, grouped in folders. A folder is, for the purposes of the digital client/server library system, a special type of item. Since a folder is an item, it can have its own parts. Although such an arrangement is possible, the normal arrangement is to group items within folders instead of having parts belong to folders. Although folders usually contain one or more items, it is conceivable that an empty folder might be created for future use. A folder does not have to have any other items or parts.

To do useful work for a patron, then, an application program must be able to interact with the digital client/server library system to manipulate data objects and metadata.

Custom application programs

A digital client/server library system, as described above, is designed to run on a variety of hardware platforms and under a variety of operating systems. Because of the need to accommodate many hardware and software scenarios, and because needs of patrons vary substantially, such a digital client/server library system normally requires the development of custom application programs.

Client application programs must be written by programmers. To make such custom application programs possible, there is provided a set of application programming interfaces (API's). An API is a software program which can be caused to execute by a custom application program, and which performs a desired operation with regard to the digital client/server library system. An example of an API is a program which initiates communication between a client and the library server. In other words, when a custom application program causes an API to execute, the API interacts with the system software to cause a corresponding library function to be performed.

As will be readily understood, a large collection of API's is provided to give programmers a set of functions rich and powerful enough to support the conceivable tasks which a custom application program might need to have a digital client/server library system perform. This collection of API's will be referred to as an "overall programming interface" between the programmer and the digital client/server library is system.

An example of a collection of API's defining an overall programming interface for a digital client/server library system is described in the following publication which is hereby incorporated by reference: "Digital Library Application Programming Reference Volume 1", July 1996, IBM Corporation, Document Number SC26-8652-00. The particular overall programming interface defined in this publication is exemplary of a rich and powerful set of functions. In all, this publication describes a collection of three hundred sixty seven API's, and there are nearly one thousand three hundred pages of explanation relating thereto.

In the art, a collection of such API's is sometimes referred to as an "API". To avoid confusion, however, in this description the discrete functions or programs which may be called by a custom application program are referred to as API's, and the collection of all API's is referred to as the overall programming interface.

A custom application program conventionally causes an API to perform a desired operation by issuing a "call" to the API. Likewise, from the point of view of the API, the API conventionally is "called" by the custom application program. The statements involved in issuing a call to an API are normally included in the original programming statements (i.e., the source code) of a custom application program. A custom application program for the digital client/server library system therefore conventionally includes, in its source code, statements in a programming language, such as C, and call statements for calling API's.

Thus, to write a custom application program for the digital client/server library system, a programmer must be acquainted with the programming language as well as with the call statements which are necessary for calling the API's.

Conventional overall programming interface problems

As mentioned above, client application programs for a digital client/server library must be custom made by programmers. To make such custom application programs possible, a collection of API's is provided so that a custom application program can cause the library system to perform desired operations, usually by issuing calls to API's.

In the above-described digital client/server library system, the overall programming interface actually comprises several hundreds of API's. Although this may seem to be a staggering number, one of skill in the art will recognize that it is highly desirable to have available a set of functions that is rich and powerful. The number and kind of available API's tend to define the level to which a custom application program can be tailored to a particular situation. The provision of hundreds of API's yields a powerful and extremely customizable set of functions as the overall programming interface to the digital client/server library system.

There are, nevertheless, problems associated with this overall programming interface.

For example, to be able competently to write custom application programs, a programmer must first be able to program in a suitable programming language. Moreover, a programmer must understand the overall conceptual framework of the particular digital client/server library system for which he is developing a program. In addition, a programmer must have a good working knowledge of the metadata and data objects (i.e., he must understand the "schema" of the library). Also, a programmer must master the several hundreds of API's provided in the conventional overall programming interface. Furthermore, a programmer must have expertise in using the API's in the proper manner.

This last point is extremely important. The API's of the conventional overall programming interface allow the programmer nearly complete control over every aspect of the custom application program. That control includes control over memory management, pointer management, data management, and session management. Concomitant with the ability to control these aspects of the custom application program, however, is the heavy burden of correctly controlling the same.

In other words, the programmer must not only understand and master the actual programming language, the syntax and meaning of the API calls, and the schema and operation of the digital client/server library system, he must also correctly weave this information together so as to produce a custom application program which properly manages memory, pointers, data, and sessions.

The training required to produce such a programmer is indeed extensive and expensive. Novice programmers cannot be expected to be able to produce meaningful custom application programs. Yet, there is in the industry a great shortage of highly skilled programmers who have, or are capable of attaining, the level of knowledge to write custom application programs for a digital client/server library system. The skills required to produce such custom application programs provide a formidable barrier to their widespread development.

In addition, the above-described overall programming interface is complex and difficult to understand. Although extensive features provide the programmer with tremendous power to create a custom application program for a digital client/server library system, these same features lead to the provision of hundreds of API's in the overall programming interface. The overall programming interface can thereby appear to be bewilderingly complex and hard to grasp.

Given the lack of adequate programming expertise experienced in many organizations, the prospect of creating custom application programs for a digital client/server library becomes quite expensive, requiring intensive training for in-house staff, or requiring extensive use of contract staff.

SUMMARY OF THE INVENTION

It is an object of the present invention to solve the problems described above by providing a new overall programming interface that insulates programmers from most of the complexity of a conventional overall programming interface. This is accomplished by providing a system for and a method of creating custom application programs for a digital client/server library system. To wit, a new overall programming interface is provided which relies on an object oriented (OO) paradigm. The interface includes a small set of object classes which create executable objects. The executable objects, and not the custom application program, issue the necessary calls to the API's, and are selected so as to correctly to manage memory, pointers, data, and sessions. The new overall programming interface is especially simple and efficient, and its classes are organized around concepts which are easily understood by even novice programmers.

BRIEF DESCRIPTION OF THE DRAWINGS

The above and other objects and advantages of the invention will become more apparent and more readily appreciated from the following detailed description of the preferred embodiments of the invention taken in conjunction with the accompanying drawings.

DETAILED DESCRIPTION OF THE PREFERRED EMBODIMENT

Figure 1:
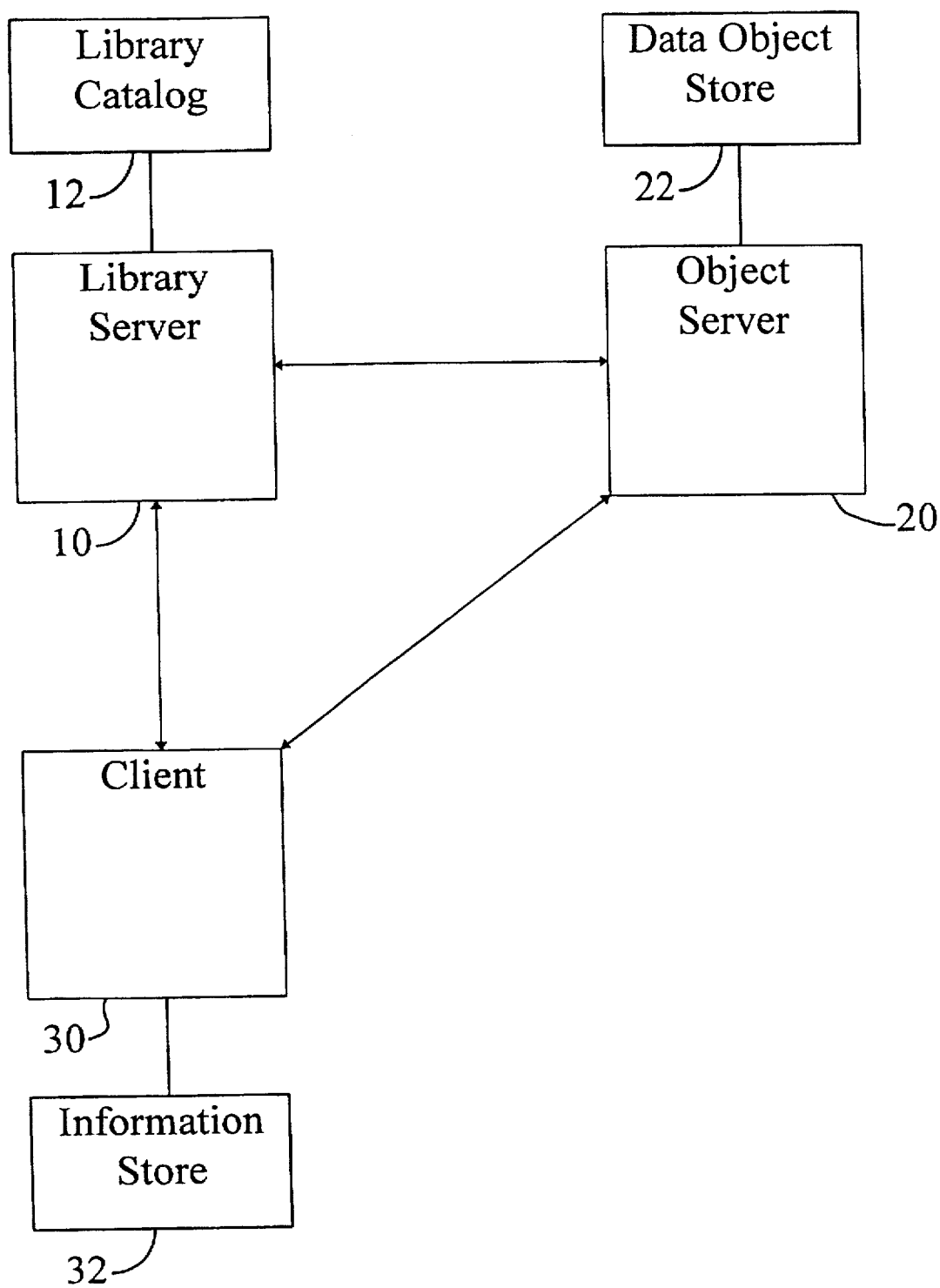
FIG. 1 is a diagram showing a conceptual model of a digital client/server library system.

In the invention, the object oriented (OO) paradigm is applied so as greatly to simplify the overall programming interface. The OO paradigm is described briefly below. One of skill in the art of writing computer programs is intimate with these concepts, which are described at length in the book "Object-Oriented Analysis and Design", by Grady Booch (2d. ed., Addison-Wesley, 1994), which is hereby incorporated by reference. Object oriented programming (OOP) is also described to some extent in U.S. Pat. No. 5,247,669, which issued on Sep. 21, 1993, is assigned to International Business Machines Corporation, and also is hereby incorporated by reference.

The use of object oriented programming languages has increased in popularity. OO systems and processes have been the subject of much investigation and interest in state of the art systems such as the digital client/server library system. 10 OOP is particularly notable in that it provides reusable and easily expandable programs to respond to new requirements. OOP languages are those which use objects as fundamental building blocks, which treat each object as an instance of a class, and which support an object's inheritance of attributes from classes beyond an initially named class (i.e., from "superclasses"). An example of such a programming language is C++.

In OOP, objects are defined by creating "classes" which are not objects themselves, but which act as guides that instruct a compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise, objects are destroyed by a special function called a "destructor". Objects may be used by manipulating their data and invoking their functions.

Thus, classes are, in a substantial sense, a "blueprint" from which objects, upon creation, take their particular form.

In the OO paradigm, objects are held accountable for being able to accomplish certain behaviors. That is, objects have responsibilities. The responsibilities of an object comprise all of the services it provides. These services are defined by the class from which the object is created. To understand an object, and the class on which it is based, a good starting point is to understand the responsibilities of the object. It is worth noting that a class does not have any responsibilities, because a class does not actually do anything. A class is like a blueprint. A class does, however, define the responsibilities of an object created from that class. Thus, an understanding of the responsibilities of an object can be gained by studying the object's class.

To cause an object to carry out one of its responsibilities (i.e., to do useful work), a program sends the object a message. In response, the object performs the corresponding task or service. The actual functions which an object can perform in response to a message or request are called "methods" or "member functions" of the object. In the remainder of this description, the term "member function" will be used to indicate a function that an object can perform.

Thus, to get an object to perform a service for which it is responsible, the first step is to create the object from the desired class using a constructor. The next step is to send a formatted message to the object to invoke the desired member function of the object. The set of possible formatted messages which may be sent to and received from an object are the object's protocol. Object protocol is well understood by one of skill in the art and is more fully described in the references mentioned above.

Here, the reader is cautioned to distinguish between data objects, which are described above, and OOP objects. Data objects are binary data such as an image, spreadsheet, animated image, text, etc. OOP objects are created by an application program during execution, and take their form on the basis of their class. Herein, OOP objects are referred to as "objects", and data objects as "data objects".

According to the presently preferred embodiment of the invention, six classes are provided in place of the hundreds of API's. Thus, instead of a custom application program calling any API's directly, it creates an object from one of the six classes to request a library function. The object, based on the request, issues the necessary calls to the appropriate API's on behalf of the custom application program. The API's reply to the object, instead of the application program, and the object presents information returned by the API's to the application program, or to another object, as necessary.

The six classes therefore are a new overall programming interface which buffers the programmer from the API's. In one sense, the new overall programming interface provides a layer of insulation between the programmer and the hundreds of API's of the conventional overall programming interface. Therefore, in this description, the API's will be referred to as the "underlying API's" with respect to the new overall programming interface. As well, the new and the conventional overall programming interface will now be referred to as "new interface" and "old interface", respectively.

Even though the new interface insulates the programmer from the underlying API's, the programmer is still able to call any of the underlying API's as he sees fit for the particular custom application program he is developing.

The new interface differs from the old in that it was developed with simplicity and ease of use as the primary goals, instead of customizability and power. The six classes of the new interface do not even attempt to offer identically the same is functions as the hundreds of API's of the old interface. Some functions are deliberately left out, either completely or partially. This omission was done to streamline the classes and make them easier to use.

Since objects created from the classes of the new interface issue calls to selected ones the underlying API's, programs written with the new interface can behave exactly as if they had been written using the old interface. Programs using the new interface require much fewer lines of source code, are easier to understand and maintain, and are more reliable. The improvement in reliability is due to the classes defining member functions for performing most of the details of memory management. The inventors have determined that one of the most frequent causes of problems in programming using the conventional overall programming interface is poor memory management. This includes the failure to free memory, and the mishandling of pointers. The classes of the new interface do not prohibit a programmer from causing such problems, but can greatly reduce their occurrence.

Minimal C++ programming experience is required. Handling exceptions, using templates, and creating subclasses are not required to build a custom application program. The classes do not employ the concept of inheritance. That is, none of the classes of the new interface have "superclasses" from which they inherit any attributes. Users of the classes may elect to use exception handling, to use templates, and to create subclasses, but that is not required. The emphasis on simplicity reduces the burden of using the classes, especially for novice programmers. Ordinarily, inheritance is a feature which gives OOP much of its power. Here, however, the inventors have realized that the use of inheritance might unduly burden a novice programmer with unfamiliar concepts.

One of the goals of the design was to minimize the visibility of the data structures used by the underlying API's and of the old interface without sacrificing performance. The strategy employed was to encapsulate the very complex structures returned by the API's, to provide access functions to the data in the original format that the API's return, and to avoid creating a multitude of small objects. This is why there is no class for an attribute value pair, as would be expected. Instead, the objects is created from classes which represent parts and which represent items have member functions (and not objects) that return attributes and values. The classes feature private data members that are pointers to the data structures of the API's. A programmer is thereby isolated from the details of access and storage management.

The classes were selected to take advantage of the functions in the API's that return lists in complex data structures. Such complex lists maximize the efficiency of the server and the communication resources, but under the old interface they added great complexity to the client application program, where the data structures had to be interpreted. The data structures that are returned from an API as the result of a search or folder expansion are especially complex. For example, the rows which are returned can belong to different index classes. Such a result is called a heterogeneous set of data. This situation is much different from the more familiar query result from relational databases, in which purely homogeneous sets are returned. The classes encapsulate this complexity.

The classes of the new interface

Now, a description of the responsibilities for each of the six classes is provided.

Library class: The Library class defines objects which maintain schema information about a particular digital client/server library. They hold information about attributes and index classes, allowing lookup by name or number. These lookup member functions simplify the task of writing user interfaces that expose names rather than numbers. The Library class defines member functions for logon, logoff, and access to the session handles. The Library class thus defines a session management feature of the new interface, and provides the means by which an applications program may call one of the underlying API's.

Query class: The Query class defines objects which hold the information needed to perform a search. It defines a member function to specify a search string. It defines other member functions which specify whether to include folders and whether to search a specific class or all classes. The Query class creates an object which defines a query, although the query is actually executed by an object created from the Meta Data List class described below. In a preferred embodiment, the Query class does not itself call any API's.

Content Data class: The Content Data class defines objects which represent a single piece of content in a data object server (i.e., a "single part" or a "data object"). An object created from this class doesn't contain the actual data, but does provide member functions to retrieve a single part from a data object server, as well as member functions that return information about the part.

Content List class: The Content List class defines objects which represent a list of parts. It provides the list of parts stored under a single item. An object created from this class has member functions to retrieve parts into memory and to return information about them. Because of the additional state data required, it is this class which must be used to create an object that retrieves a part into a file or stores a part in the library.

Meta Data class: The Meta Data class is used to create an object that represents an item in the library server. It defines member functions to create and to delete a row in an index class table. This class is used to create an object which creates or updates an individual item in the library server.

Meta Data List class: The Meta Data List class is used to create an object that represents a list of items in the library server or a search result. In VISUALINFO terms, it creates an object that represents a folder and includes a table of contents and a snapshot structure. There are defined member functions that return the attributes of the items by row number and by relative attribute number. The list can contain heterogeneous rows, so the number of attributes on different rows of the same list may vary. The attributes are always returned as character data. This class defines member functions that populate content lists and meta data lists from rows, so as to allow folder navigation and part retrieval. The member function to perform a query defined by the Query class is defined here. This class is used to read a list of items, while the Meta Data class is used to create or to modify an individual item.

An important, though not strictly essential, feature of the invention is that, except for the constructor member function, none of the classes has a member function which creates another object. This might seem strange, since the creation of an object by another object, without the need for a command from an application program, is one of the most important features of OOP. In the invention, however, the fact that the classes do not have member functions for creating objects (excluding, of course, the constructor member function) proves highly advantageous.

One reason for this is that it is very hard to return an error code from a constructor. For example, when objects are allowed to create objects on their own, if an error occurs then it is difficult for the application program to know where the error occurred. The error might have occurred in the creation of object 5, which had automatically been created by object 4, which had automatically been created by object 3, and so on through object 1, which had been created by the application program. In such situations, the application program can hardly detect the source of the error. Since the invention was created with simplicity and with the needs of novice programmers in mind, the advantage of not creating objects from other objects is clear: when an error occurs, the source of the error is much easier to discover.

Another reason for designing the classes of the invention so as not to have member functions which create objects (except for the constructor member function) is that the problem of memory leakage is ameliorated. Memory leakage refers to the following general problem. Each object requires memory, but the memory used is freed up when the object is destroyed. More objects mean more use of memory. When objects create objects, more and more memory is consumed. An application program which creates an object and invokes its member functions might not realize that such member functions often generate numerous other objects, and these might generate even more objects. Now, the application programmer may be careful enough to destroy the object he created once he is finished with it. It is unlikely, however, that a novice programmer will consider or even be able to destroy the objects which were generated as a "side-effect" of the original object's work, even though the side-effect objects may now be superfluous. As the application program continues to work, there eventually are so many objects that the amount of available memory, like a faucet, "leaks" away. Insufficient memory causes a variety of problems with computer systems which are familiar to those of skill in the art.

Restricting the member functions of the classes of the invention from being able to create objects does not completely prevent memory leakage. Programmers are still free to create their own classes and subclasses which perform all manner of memory leakage. Nevertheless, the advantageous definition of the classes of the invention greatly reduces the probability of memory leakage occurring.

Not all classes have member functions which call API's. In the preferred embodiment, the Query class does not have a member function which calls an API. This is a matter of design choice, and is not critical to the invention. Furthermore, it will be clear that not every member function requires an API call. Some member functions interface with the digital client/server library system, and necessarily require calls to API's. Other member functions interface, for example, with only the application program. In such a case, no API need be called.

An example session

The overall operation of the classes and the objects created from them can be described in an example session. From this example, it will become sufficiently clear to one of skill in the art the manner in which the objects interact. Although it would be impossible completely to define all possible scenarios involving the objects, the following example will serve to highlight the critical features of the classes. An example of a specific implementation of the invention according to the six classes of the preferred embodiment is contained in the following publication, which is herein incorporated by reference: "IBM Digital Library C++ Application Programming Guide and Reference", first edition, July 1996, IBM Corporation, Document No. SC26-8657-00.

As a first step, an application program creates a Library object. The Library object, at this point, is "empty". By sending the Library object a message which includes appropriate information about a desired digital client/server library system, an application program invokes the member function(s) of the Library object which allow the object to establish a session with the particular desired digital client/server library system by using one or more of the underlying API's. The object, after establishing the session, downloads and retains the data schema of the library, again using the appropriate underlying API's. If access to multiple digital client/server library systems is desired, multiple Library objects can be instantiated and appropriately invoked to do so. In this example, the digital client/server library system pertains to the above-mentioned collection of movies.

Suppose the purpose of the application program is to permit the user (1) to query the digital client/server library system based on the quality rating of the movie, (2) to select one of the movies satisfying the constraints of the query, (3) to retrieve the index data pertaining to the movie for inspection and possible update, (4) to retrieve the information relating to the movie's parts, (5) and to retrieve a copy of a selected part of the selected item into memory or into a file for subsequent viewing or playing.

In such a case, the application next creates an empty Query object and an empty Meta Data List object. After collecting the necessary information from the user in any conventional manner, the query search string is supplied to the Query object. When the query information is appropriately defined within the Query object, the application program invokes a member function of the Meta Data List object to perform that query. The Meta Data List object calls the appropriate underlying API's, and receives the result of the query in a complex data structure.

In the preferred embodiment, the application program waits until the results have been returned. The application program then sends a message to the Meta Data List object so as to obtain from it a list of the items that fulfill the constraints of the earlier query (e.g., a list of all of the movies in the collection with a rating of five stars, which includes The Sound of Music, Robin Hood, and King Kong). The user is presented the list in any well-known manner, and is prompted to select one item. The user's selection (The Sound of Music, for example) is noted by the application program.

To display the metadata pertaining to the selected one item, the application program sends an appropriate message to invoke a member function of the Meta Data List object that returns such information for the item. In response to the message, the member function of the object is invoked, and the metadata pertaining to that selected item is provided to the application program for display to the user in any known manner.

If, at this point, the user desires to update the metadata pertaining to this selected item, the application program must create an empty Meta Data object. The Meta Data object, as mentioned above, represents only one item. It is the only object which can update or create an item. The application program then must invoke the update member function of the object by passing the object an appropriate message.

One of skill in the art will appreciate that the format of such a message may vary, but will have to contain enough information for the object to identify the item to be updated and the nature of the update.

Upon the user's acknowledgment to proceed to the next step, for example, the application program may turn to the task of obtaining the list of parts pertaining to the elected item. The application program creates an empty Content List object, and hen invokes a member function thereof by sending it a message sufficiently identifying The Sound of Music as the selected item. The member function so invoked is the member function which obtains a list of parts. The Content List object, in carrying out the member function, calls the proper APJI's to obtain from the library server the information in a complex data structure indicating what parts are stored under the selected item. The application program then invokes the member functions of the Content List object to obtain from that object the simplified list of parts (i.e., first scene, second scene, first song, second song, special sound effect 1, closing credits, etc.). The application program presents the user the list of parts in any well-known manner, and prompts the user to select one.

Figure 2:
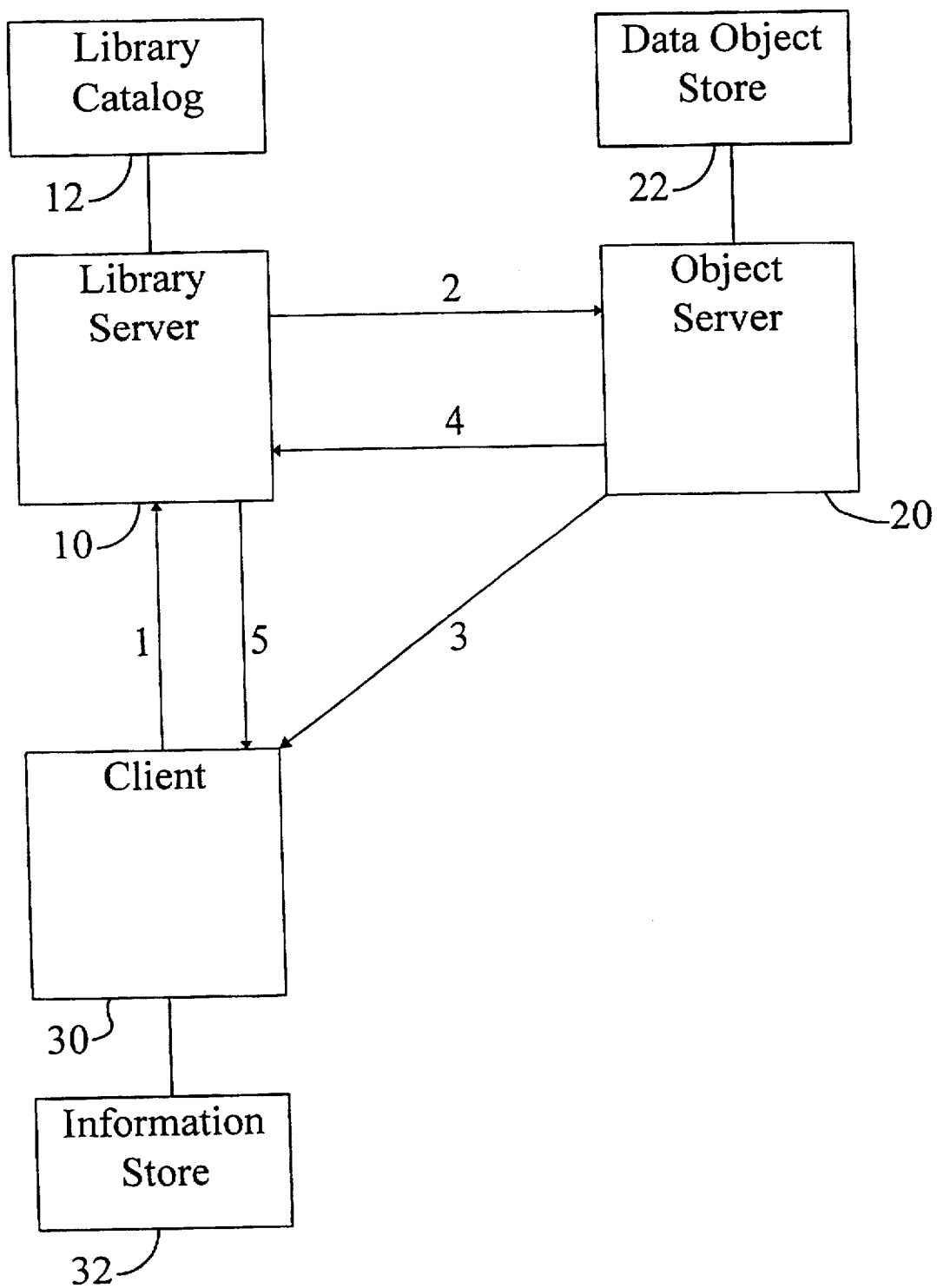
FIG. 2 is a diagram showing data flows in a digital client/server library system.

In response to the user's selection, the application program may invoke a member function of the Content List object which provides to the application program information about a part selected by the user. The Content List object has a member function which retrieves a selected part (e.g., second song—Edelweiss) into the memory of the client workstation. If a part update, creation, deletion, or retrieval into a file is desired, however, a Content Data object must first be created by the application program, and then sent appropriate messages to invoke the desired member functions thereof. The Content Data object is the only one which can perform part updating, creation, or retrieval into a file (as opposed to memory). The operation of the Content List object and of the Content Data object is carried out by calls to the appropriate ones of the underlying API's. As mentioned above, the parts reside in data object servers and are retrieved according to the steps illustrated in FIG. 2.

From this example session, it will be appreciated by one of skill in the art that the critical feature of the invention is the replacement of hundreds of functionally-oriented API's with a small set of easily understandable classes which represent conceptually simple objects, and which bear the burden of communicating with the API's, of managing memory and pointers, of managing sessions with libraries, and of handling complex data structures. Moreover, it will be appreciated that the particular classes described above are particularly advantageous in a distributed data management scenario in which metadata and content information are handled separately, as in a digital client/server library system. It will further be appreciated that several variations are possible.

Although the description above contains many specificities, these should not be construed as limiting the scope of the invention but merely as providing an illustration of the presently preferred embodiment of this invention. For example, the Query class could be modified so that objects created therefrom perform the query instead of objects of the Meta Data List class. Also, the classes have member functions which call API's. It is within the skill of those in the art to write member functions which interface directly with the system software of the digital client/server library system. Additional member functions may be added to the classes to provide additional features. Thus, the scope of the invention should be determined by the appended claims and their legal equivalents, rather than by the example given.

What is claimed is:

1. A system for performing library functions on data objects, said system comprising:

a digital client/server library system having components which include: (1) clients, (2) an object server for storing said data objects, and (3) a centralized server having information stored therein regarding a respective location of each of said data objects, each of said clients, and the object server, wherein said library functions include storing and managing said data objects, wherein said data objects are each a single content part, and each correspond to at least one item;

system software of said library for controlling said components to perform said library functions;

a set of callable application programming interfaces (API's), each of said API's, when called, causing said system software to control said components to perform a corresponding one of said library functions, said set of API's defining a first overall programming interface of said library; and an application program which, upon execution, causes one of said API's to be called so that said corresponding one of said library functions is performed; and a set of object oriented programming classes for interfacing between said application program and said API's, each of said object oriented programming classes defining executable objects that share a common respective structure and a common respective behavior, at least one of said executable objects, after creation thereof, calling a selected one of said API's, said set of object oriented programming classes defining a second overall programming interface of said library;

wherein said application program, upon said execution thereof, causes said selected one of said API's to be called by (1) creating said at least one of said executable objects and then by (2) causing said at least one of said executable objects to call said selected one of said API's.

2. The system as set forth in claim 1, wherein said object oriented programming classes do not employ class inheritance.

3. The system as set forth in claim 1, wherein said object oriented programming classes for interfacing between said applications program and said API's comprise:

a first object oriented programming class representing a library schema;

a second object oriented programming class representing a query of said digital client/server library system;

a third object oriented programming class representing only one of said data objects;

a fourth object oriented programming class representing a plurality of said data objects;

a fifth object oriented programming class representing only one said item; and a sixth object oriented programming class representing a plurality of said items.

4. The system as set forth in claim 1, wherein said object oriented programming classes for interfacing between said applications program and said API's consist of:

a first object oriented programming class representing a library schema;

a second object oriented programming class representing a query of said digital client/server library system;

a third object oriented programming class representing only one of said data objects;

a fourth object oriented programming class representing a plurality of said data objects;

a fifth object oriented programming class representing only one said item; and a sixth object oriented programming class representing a plurality of said items.

5. The system as set forth in claim 1, wherein a number of said object oriented programming classes is less than a number of said API's.

6. The system as set forth in claim 1, wherein none of said object oriented programming classes defines a member function, other than a constructor member function, for creating one of said executable objects.

7. In a digital client/server library system, a method of performing library functions, the library functions including storage and retrieval of items which are comprised of content parts, each of the items and each of the parts having corresponding metadata, the metadata including index data, the method comprising the steps of:

providing a set of callable application programming interfaces, each of which, when called, performs a respective predefined one of the library functions;

providing a set of object oriented classes as an interface between an application program and the API's, each of the object oriented classes having respective member functions, the set of object oriented classes representing:

a schema of the digital client/server library system, only one of the items, a selected plurality of the items, only one of the parts, a selected plurality of the parts, and a metadata query, wherein the set of object oriented classes defines at least one of said member functions a member function which calls one or more corresponding API's;

executing a custom application program which creates an executable object from a selected object oriented class of the set of object oriented classes, and which invokes the at least one member function defined therein; and carrying out the invoked member function so that the created executable object calls the one or more corresponding API's to perform the respective predefined ones of the library functions.

8. The method as set forth in claim 7, wherein said object oriented class representing the schema of the digital client/server library system defines member functions for:

logon to the digital client/server library system;

logoff from the digital client/server library system; and access to direct calling of the API's.

9. The method as set forth in claim 7, wherein none of said object oriented classes has a superclass.

10. The method as set forth in claim 7, wherein:

the object oriented class representing the query has, as one of the respective member functions thereof, a member function to specify a query search string; and the object oriented class representing the plurality of items has, as one of the respective member functions thereof, a member function for performing the query based on the search string.

11. The method as set forth in claim 7, wherein, except for the definition of a constructor member function, none of the object oriented classes defines a member function of creating another executable object.

12. In a digital client/server library system, a method of performing library functions, the library functions including storage and retrieval of items which are comprised of content parts, each of the items and each of the parts having corresponding metadata, the metadata including index data, the method comprising the steps of:

providing system software having system software functions each of which, when called, performs a respective predefined one of the library functions;

providing a set of object oriented classes as an interface between an application program and the system software, each of the object oriented classes having respective member functions, the set of object oriented classes representing:

a schema of the digital client/server library system, only one of the items, a selected plurality of the items, only one of the parts, a selected plurality of the parts, and a metadata query, wherein at least one object oriented class of the set of object oriented classes includes therein at least one member function definition which calls one or more corresponding system software functions of said system software;

executing the custom application program to create an executable object from the at least one object oriented class, and to invoke the at least one member function defined by the selected object oriented class; and carrying out the invoked member function so that the created executable object calls the one or more corresponding system software functions to perform the respective predefined ones of the library functions.

13. The method as set forth in claim 12, wherein said object oriented class representing the schema of the digital client/server library system defines member functions for:

logon to the digital client/server library system;

logoff from the digital client/server library system; and access to direct calling of the system software functions.

14. The method as set forth in claim 12, wherein none of said object oriented classes has a superclass.

15. The method as set forth in claim 12, wherein:

the object oriented class representing the query has, as one of the respective member functions thereof, a member function to specify a query search string; and the object oriented class representing the plurality of items has, as one of the respective member functions thereof, a member function for performing the query based on the search string.

16. The method as set forth in claim 12, wherein, except for the definition of a constructor member function, none of the object oriented classes defines a member function of creating another executable object.

\* \* \* \* \*